United States Patent [19]
Tronolone et al.

[11] Patent Number: 5,532,821
[45] Date of Patent: Jul. 2, 1996

[54] TESTING OF RECESSED SURFACES AT GRAZING INCIDENCE

[75] Inventors: Mark J. Tronolone, Fairport; Paul G. Dewa, Newark; James E. Platten, Penfield; John H. Bruning, Pittsford, all of N.Y.

[73] Assignee: Tropel Corporation, Fairport, N.Y.

[21] Appl. No.: 404,923

[22] Filed: Mar. 16, 1995

[51] Int. Cl.⁶ ..................................................... G01B 9/02
[52] U.S. Cl. ............................................ 356/359; 356/355
[58] Field of Search ................................... 356/353, 355, 356/357, 359, 360, 361, 371

[56] References Cited

U.S. PATENT DOCUMENTS

| | | |
|---|---|---|
| 2,601,175 | 6/1952 | Smith . |
| 2,693,735 | 11/1954 | Zehender . |
| 3,514,182 | 5/1970 | Banks . |
| 3,514,183 | 5/1970 | Rabedeau . |
| 3,520,595 | 7/1970 | Treuthart . |
| 3,891,320 | 6/1975 | Kimura et al. . |
| 4,325,637 | 4/1982 | Moore . |
| 4,411,492 | 10/1983 | Bluege . |
| 5,095,389 | 3/1992 | Yokomori . |
| 5,220,403 | 6/1993 | Batchelder et al. . |
| 5,305,089 | 4/1994 | Hosoe . |

FOREIGN PATENT DOCUMENTS

| | | | |
|---|---|---|---|
| 0048347 | 4/1977 | Japan | ..................................... 356/359 |
| 0678276 | 8/1979 | U.S.S.R. . | |

OTHER PUBLICATIONS

"Interference Flatness Testing of Nonoptical Surfaces", Briers, Applied Optics, Mar. 1971, 519–524.

*Primary Examiner*—Samuel A. Turner
*Attorney, Agent, or Firm*—Eugene Stephens & Associates

[57] ABSTRACT

An interferometer (10) includes a prism extender (50) appended to a prism (32) for directing a beam of light (42) into a recess (44) of a test piece (34). A first portion (42a) of the beam (42) refracts from a reference surface (54) of the prism extender (50) to an angle (α) of grazing incidence on a bottom surface (46) of the recess (44), and a second portion (42b) of the beam (42) reflects from the reference surface (54). The two portions (42a and 42b) of the beam (42) recombine at the reference surface (54) forming an interference pattern indicative of differences between the reference surface (54) and the bottom surface (46) of the recess (44).

43 Claims, 3 Drawing Sheets

TESTING OF RECESSED SURFACES AT GRAZING INCIDENCE

TECHNICAL FIELD

The invention relates to the field of optical measurement using interferometry to test surfaces at grazing incidence.

BACKGROUND

Interferometers are increasingly used in manufacturing environments for measuring surfaces, especially spherical or planar surfaces that can be represented by common wavefronts. A beam of coherent light is shaped to the desired wavefront and is divided into test and reference wavefronts. The test wavefront undergoes reflection from the test surface before being recombined with the reference wavefront. Any changes to the test wavefront are visible as an interference pattern produced by amplitude variations of the overlapping wavefronts.

The interference patterns, also referred to as interferograms, provide a map of phase differences between the two wavefronts. Periodic phase differences appear as bands of light, also referred to as "fringes". The spacing between fringes is a function of sensitivity of the interferometer. Cumulative changes in phase across the interference pattern are calculated using so-called "phase shifting" techniques that expose relationships between adjacent fringes. For example, the relative path lengths or the wavelengths of the test and reference wavefronts can be varied to determine if the phases of adjacent fringes are relatively advanced or retarded.

Sensitivity can be controlled by adjusting either the wavelength or the angle of incidence to maintain fringe density within a range that can be most effectively interpreted. The spacing between fringes of a single pass interferometer in which the test wavefront is reflected only once from the test surface corresponds to a height variation in the test surface equal to the wavelength divided by twice the cosine of the angle of incidence. At normal incidence, the height variation represented by an adjacent fringe is equal to one-half the wavelength. At higher angles of incidence, the adjacent fringes represent greater height variations and are spaced farther apart.

Higher angles of incidence are also used to measure surfaces having low specular reflectivity. For example, surfaces much rougher than optical quality can be measured at grazing incidence, which is defined herein as a non-normal angle of incidence sufficient to produce specular reflection. The higher angle of incidence also reduces sensitivity for maintaining fringe density within acceptable limits.

Commonly assigned U.S. Pat. No. 4,325,637 to Moore discloses a single-pass interferometer for measuring flat surfaces at grazing incidence. A light source in combination with a collimator produces a planar wavefront that is transmitted by a prism located adjacent to a test surface. One portion of the planar wavefront refracts from a prism reference surface as a test wavefront that strikes the test surface at grazing incidence, and another portion of the planar wavefront reflects from the same reference surface as a reference wavefront. The reflected test wavefront recombines with the reference wavefront on return through the reference surface. An interference pattern produced by the recombined wavefronts is projected onto a detector for analysis of test surface flatness.

Recessed surfaces that are very shallow can be similarly measured, but the side walls of deeper recessed surfaces block both incoming and outgoing rays—a phenomenon referred to as "shadowing". For example, recessed surfaces having aspect ratios of length to height less than 30 to 1 cannot be measured at all using incident angles of 86 degrees or more, which are common for measuring non-specular surfaces. Significant portions of shallower surfaces are also obscured. Such shadowing can be reduced by reducing the angle of incidence, but this option is often precluded by surface roughness or low specular reflectivity.

SUMMARY OF INVENTION

Our invention provides for optically measuring recessed surfaces at grazing angles, which can be selected to achieve desired test surface reflectivity and interferometer sensitivity. Even relatively deep recesses can be measured largely independent of the grazing angle with only a limited amount of shadowing associated with the transmission of light into and out of the recesses.

A preferred embodiment of our invention includes the conventional features of a light source producing a primary beam of light and a prism transmitting the primary beam toward a test piece. However, the embodiment also includes a prism extender that is sized to fit within a recess of the test piece between the prism and a bottom surface of the recess. The prism extender has a reference surface that reflects a portion of the primary beam as a reference beam and transmits another portion of the primary beam as a test beam. After reflecting from the bottom surface of the recess at grazing incidence, the test beam recombines with the reference beam at the reference surface for producing a pattern of interference indicative of differences between the reference and bottom surfaces.

The prism extender preferably exhibits an index of refraction at least as high as the prism to minimize shadowing of peripheral portions of the bottom surface. The reference surface is located adjacent to the bottom surface of the recess at a distance that permits refraction of the test beam to a high angle of incidence while limiting the effect of the high angle of incidence on shadowing.

The prism extender preferably includes two plane-parallel surfaces separated by side walls that are shaped to fit within side walls of the surrounding recess. One of the plane-parallel surfaces is the reference surface located adjacent to the bottom surface of the recess, and the other plane-parallel surface is a mating surface located adjacent to a mating surface of the prism. An index-matching material can be used between the mating surfaces to reduce unintended reflections that interfere with the transmission of light between the prism and the prism extender. The index-matching material could be a cement for permanently bonding the prism extender to the prism or an oil for removably mounting the prism extender on the prism.

DRAWINGS

DETAILED DESCRIPTION

Figure 1:
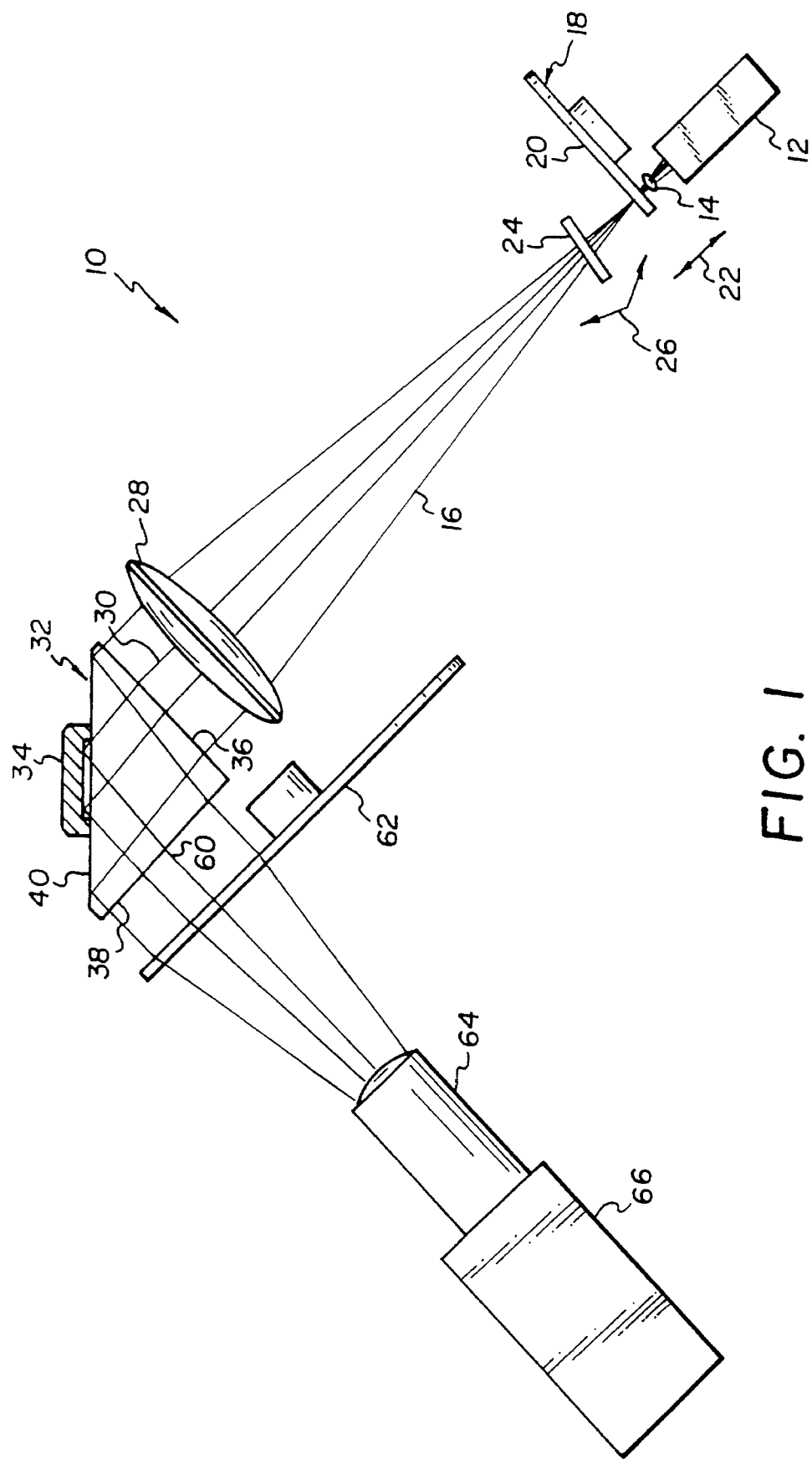
FIG. 1 is a schematic layout of an interferometer for practicing our invention.

An interferometer 10 for practicing our invention is laid out in FIG. 1. A light source 12, which is preferably a laser diode that emits a wavelength of approximately 630 nanometers, combines with a focusing objective 14 for producing a converging beam 16 of coherent light. A spatial filter and coherence adjuster 18 includes a rotating ground plate 20 that is adjustable in the direction of arrows 22 through a focus of the beam 16. The ground plate 20 can be adjusted with respect to the focus to control the coherence of the beam 16 for limiting spurious interferometric effects throughout the interferometer 10.

A fringe modulator 24 interrupts an expanding portion of the beam 16 and is pivotal in the direction of arrows 26 for performing a "phase-shifting" function for interpreting results produced by the interferometer 10. A collimator lens 28 converts the expanding beam 16 into a planar wavefront 30 that is transmitted by a prism 32 toward a test piece 34. The illustrated prism 32 is a triangular prism having two equal length sides 36 and 38 inclined to a base 40 at approximately 45 degree angles.

Figure 2A:
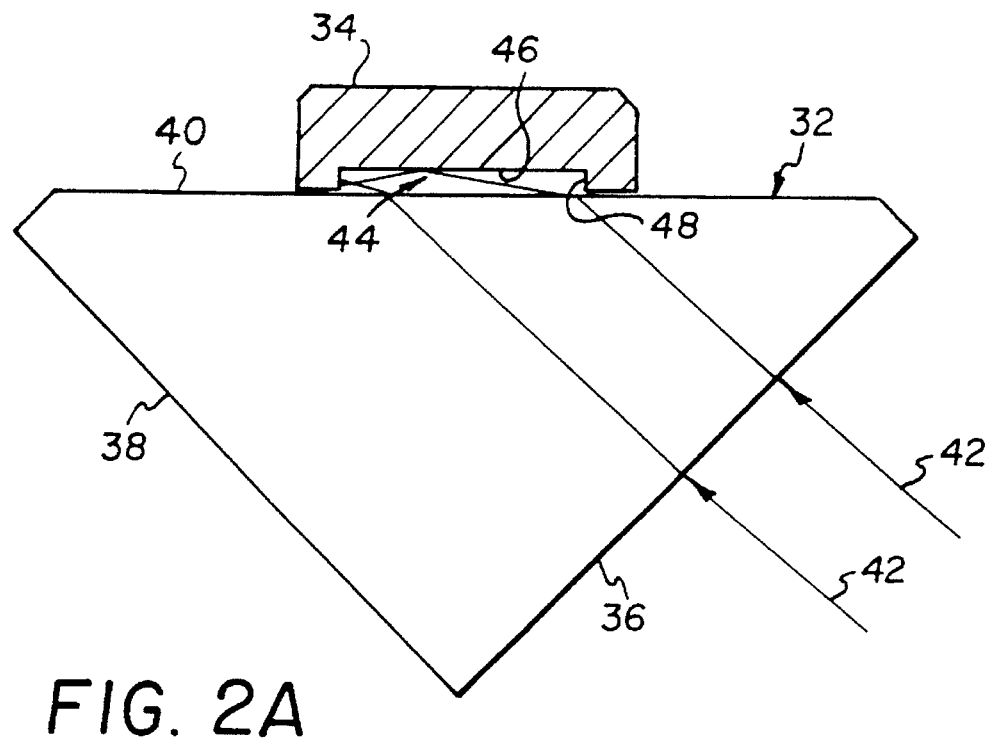
FIGS. 2A and 2B are enlarged views of a prism and a recess comparing the effects of adding a prism extender.
Figure 2B:
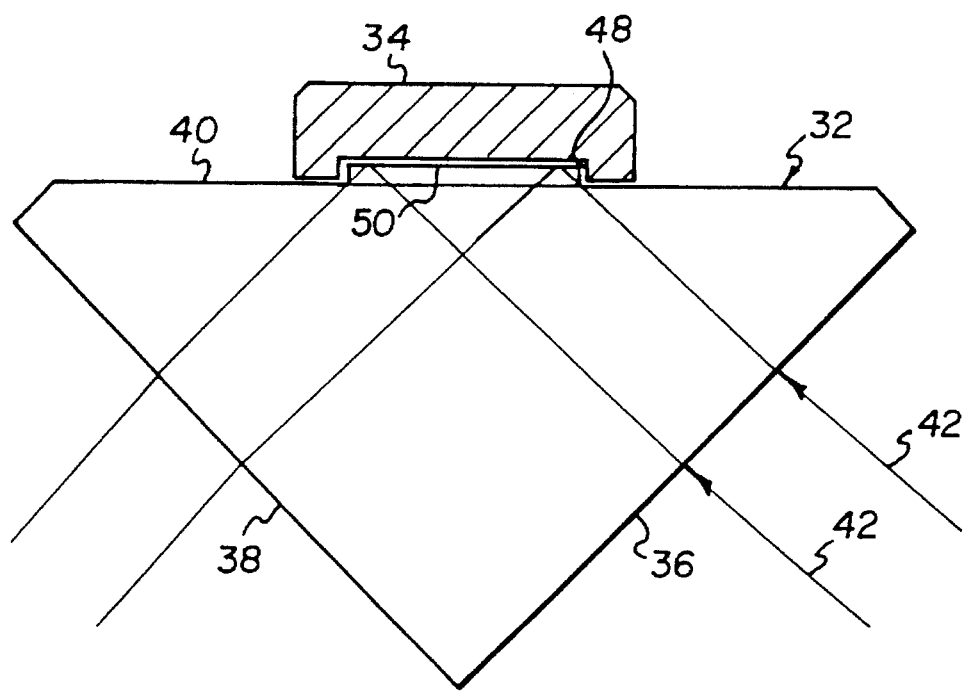

FIGS. 2A and 2B compare the respective paths of rays 42 of the planar wavefront 30 within a recess 44 of the test piece 34. According to the prior art set up of FIG. 2A, the rays 42 are refracted upon exiting the base 40 to a high angle of incidence on a bottom surface 46 of the recess 44. However, lateral travel of the rays 42 required by the high angle of incidence is obstructed by side walls 48 of the recess 44, which prevent some of the rays 42 from reaching the bottom surface 46 of the recess 44 and prevent other of the rays 42 from leaving the recess 44. The amount of such shadowing along the bottom surface 46 adjacent to each of the side walls 48 is equal to a tangent of the angle of incidence multiplied by the depth of the recess 44.

However, our prism extender 50 as shown in FIG. 2B defers refraction to a high angle of incidence until the rays 42 are much closer to the bottom surface 46. This greatly reduces shadowing and permits much deeper recesses to be measured.

Figure 3:
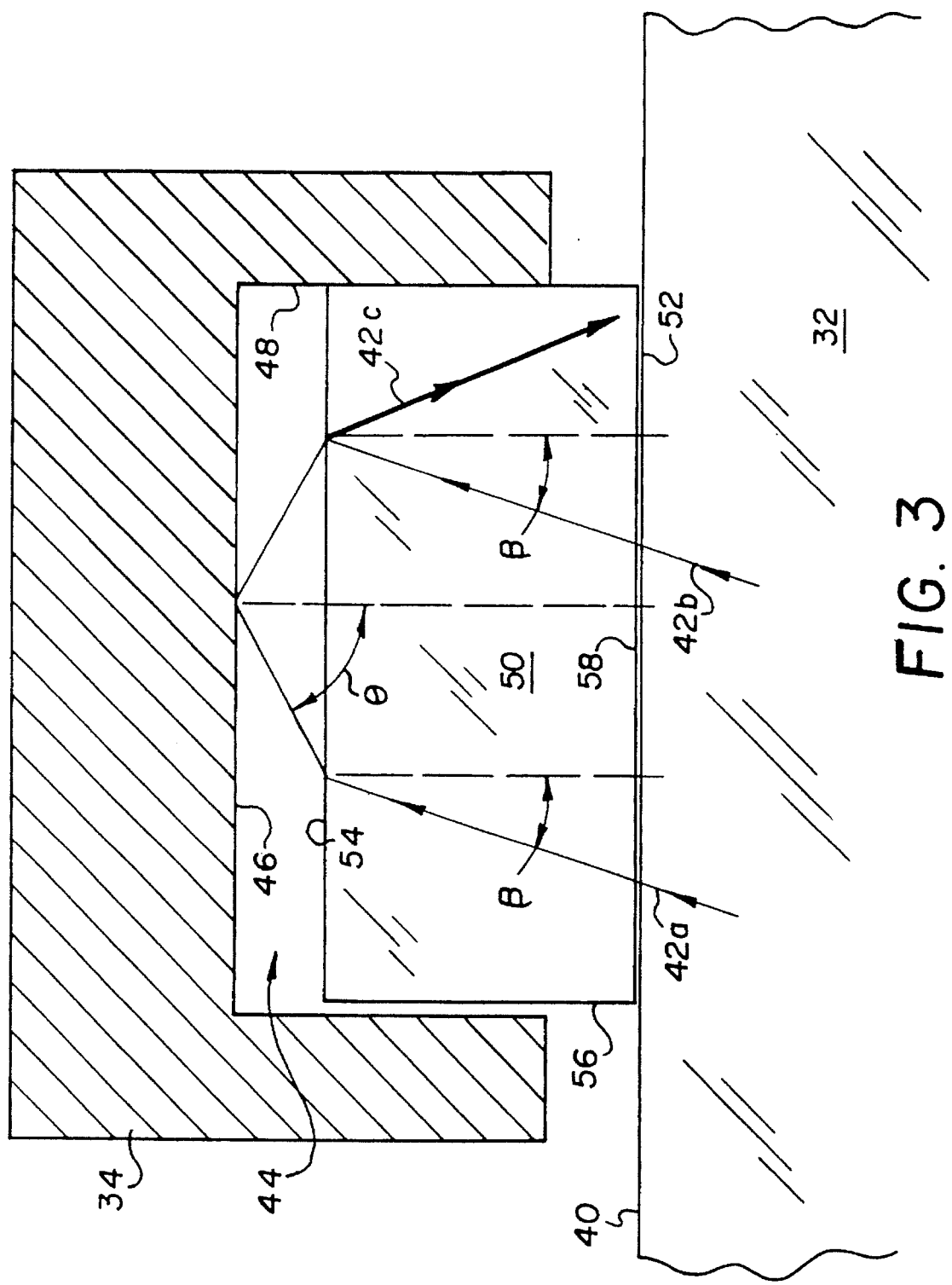
FIG. 3 is a further enlarged view of the prism extender within the recess.

An enlargement of our prism extender 50 is shown in FIG. 3. The illustrated prism extender 50 has two plane-parallel surfaces 52 and 54 separated by side walls 56. The surface 52 is mated to the base 40 of the prism by an index-matching material 58, which limits unwanted reflections from either of the mating surfaces 40 and 52. The index-matching material 58 is preferably a cement for permanently bonding the prism extender 50 to the prism 32. However, the index-matching material could also be an oil or a less permanent adhesive for removably mounting the prism extender 50 on the prism 32.

The other plane-parallel surface 54 of the prism extender 50 functions as a reference surface that is spaced at a predetermined minimum distance from the bottom surface 46 of the recess 44, which is preferably in a range between 25 and 125 microns. The spacing distance should be small enough to limit undesirable shadowing but large enough to permit refraction between the prism extender 50 and the space prior to striking the bottom surface 46.

Overall, the prism extender 50 can be shaped and sized independently of the prism 32 to fill most of the recess 44. For example, the side walls 56 of the prism extender can be shaped to match the side walls 48 of the recess. However, the surfaces 52 and 54 of the prism extender are also sized together with the side walls 56 to provide mounting clearance with the side walls 48 of the recess. The base 40 of the prism is preferably larger than the surfaces 52 and 54 of the prism extender to provide a wider optical path to and from the recess 44. The base 40 can also be used alone or in conjunction with spacers (not shown) for mounting the test piece 34.

The enlargement of FIG. 3 also distinguishes the incoming rays 42 of the planar wavefront 30 as rays 42a and 42b. Both rays 42a and 42b travel through the prism extender 50 at an inclined angle $\beta$, which contributes to an incident angle $\alpha$ at which the ray 42a strikes the bottom surface 46. The ray 42a, which is refracted from the reference surface 54 to the incident angle $\alpha$, represents a portion of the planar wavefront 30 that functions as a test wavefront. The ray 42b represents another portion of the planar wavefront 30 that functions as a reference wavefront by reflecting from the reference surface 54.

After reflecting from the bottom surface 46, the ray 42a joins with the ray 42b at the reference surface 54 forming a combined ray 42c that represents the overlapping test and reference wavefronts. Amplitude variations of the overlapping wavefronts can be viewed as an interference pattern that represents height differences between the bottom and reference surfaces 46 and 54. Pivoting motion of the ramping disc fringe modulator 24 shown in FIG. 1 varies the angle $\beta$ for changing the relative paths of the rays 42a and 42b, thereby providing the required modulation of the overlapping wavefronts for phase analysis.

The overlapping wavefronts are projected as a planar wavefront 60 through the prism extender 50 and the prism 32 onto a diffused viewing screen 62, which can be made from ground glass or plastic. The diffused viewing screen fixes an image of the interference pattern so that an ordinary zoom lens 64 can project the image onto a recording device 66 such as a charge-coupled device (CCD) camera. Other image-forming optics or recording devices could also be used to extract similar information from the planar wavefront 60.

Both the prism 32 and the prism extender 50 are preferably made of optical quality glass having a common index of refraction. However, it would be possible to further reduce shadowing by making the prism extender from a material such as silicon having a higher index of refraction. (The use of silicon would require the substitution of an infrared light source for proper transmission.) Such a higher index prism extender would refract rays entering from the prism extender more nearly parallel to the side walls 48 of the recess while refracting the rays leaving the prism extender to the same desired angle of incidence on the bottom surface 46 of the recess.

Other shapes of both prisms and prism extenders could also be used. For example, the prism could have different numbers of sides, and the prism extender could be arranged for measuring only a portion of a recess. Both the prism and the prism extender could be made as an integral body from a single piece of optical material. Also, the test wavefront could be refracted from one surface of the prism extender, and the reference wavefront could be reflected from another surface. These and many other modifications and adaptations will be apparent to others of skill in the art in accordance with our overall teaching of the invention.

We claim:

1. An interferometer for measuring recessed surfaces in test pieces comprising:

a light source for producing a primary beam of light;

a prism for projecting the primary beam toward a test piece;

a prism extender sized to fit within a recess of the test piece between the prism and a bottom surface of the recess; and said prism extender having a reference surface for reflecting a portion of the primary beam as a reference beam and for transmitting another portion of the primary beam as a test beam that reflects from the bottom surface of the recess at grazing incidence and recombines with the reference beam at the reference surface for producing a pattern of interference indicative of differences between the reference and bottom surfaces.

2. The interferometer of claim 1 in which said prism and said prism extender have adjacent surfaces, and said adjacent surface of said prism extender is smaller than said adjacent surface of said prism for fitting said prism extender within the recess.

3. The interferometer of claim 2 in which said adjacent surface of the prism and said reference surface of the prism extender have respective shapes, and said shape of the reference surface is different from said shape of the adjacent prism surface for providing clearance with a surrounding shape of the recess.

4. The interferometer of claim 3 in which said prism extender is sized in depth between said adjacent and reference surfaces for spacing said reference surface at a predetermined distance from the bottom surface of the recess.

5. The interferometer of claim 4 in which said reference surface of the prism extender is a planar surface.

6. The interferometer of claim 2 in which an index-matching material is located between said adjacent surfaces of the prism and prism extender.

7. The interferometer of claim 6 in which said index-matching material permanently bonds said prism extender to said prism.

8. The interferometer of claim 6 in which said index-matching material permits the prism extender to be removed from the prism and replaced by a different prism extender.

9. The interferometer of claim 1 in which said prism and said prism extender exhibit respective indices of refraction, and said index of refraction of said prism extender is at least as large as said index of refraction of said prism.

10. The interferometer of claim 9 in which said index of refraction of said prism extender is the same as said index of refraction of the prism.

11. The interferometer of claim 10 in which both said prism and said prism extender are made of optical glass.

12. The interferometer of claim 9 in which said index of refraction of said prism extender is higher than said index of refraction of the prism.

13. The interferometer of claim 12 in which said prism extender is made from silicon.

14. The interferometer of claim 13 in which the primary beam of light includes infrared radiation.

15. A system for testing recessed surfaces at grazing incidence comprising:

a light source for producing a beam of light;

a prism located adjacent to a test piece for transmitting the beam of light both toward and away from said test piece;

a prism extender located within a recess of said test piece between a bottom surface of said recess and said prism for transmitting a first portion of the beam of light toward said bottom surface at grazing incidence and for further transmitting the first portion of the beam reflected from said bottom surface toward said prism; and an image-forming optic that images a pattern of interference between the first portion of the beam reflected from said bottom surface and a second portion of the beam reflected from a reference surface.

16. The system of claim 15 in which said prism extender and said recess have respective side walls, and said side walls of the prism extender are shaped to fit within said side walls of the recess.

17. The system of claim 16 in which said side walls of the prism extender and the recess are similarly shaped to enable said prism extender to fill most of said recess.

18. The system of claim 15 in which said prism extender includes a first surface adjacent to said prism and a second surface adjacent to said bottom surface of the recess.

19. The system of claim 18 in which said second surface of the prism extender is spaced from said bottom surface of the recess to provide for refracting the first portion of the beam to a higher angle of incidence to said bottom surface of the recess.

20. The system of claim 19 in which said first and second surfaces of the prism extender are plane-parallel surfaces.

21. The system of claim 18 in which said prism includes a first surface for receiving the beam of light from said light source, a second surface for transmitting the first portion of the beam to and from said prism extender, and a third surface for projecting the first and second portions of the beam to said image-forming optic.

22. The system of claim 21 in which said first surface of the prism extender is located adjacent to said second surface of the prism.

23. The system of claim 22 in which said bottom surface of the recess is larger than said second surface of the prism extender and smaller than said second surface of the prism.

24. The system of claim 23 in which an index-matching material is located between said first surface of the prism extender and said second surface of the prism.

25. The system of claim 23 in which said first, second, and third surfaces of the prism are relatively oriented for receiving the beam of light as a planar wavefront impinging on said first surface of the prism and for projecting the first and second portions of the beam of light as planar wavefronts emanating from said third surface of the prism.

26. The system of claim 21 in which said second surface of the prism extender is a reference surface for reflecting the second portion of the beam of light.

27. The system of claim 26 in which the pattern of interference is indicative of differences between said reference surface of the prism extender and said bottom surface of the recess.

28. The system of claim 27 in which the first and second portions of the beam are recombined at said reference surface for producing the pattern of interference.

29. The system of claim 15 in which said prism and said prism extender exhibit respective indices of refraction, and said index of refraction of said prism extender is at least as large as said index of refraction of said prism.

30. The system of claim 29 in which said index of refraction of said prism extender is the same as said index of refraction of the prism.

31. A method of operating an interferometer for measuring recessed surfaces in test pieces comprising the steps of:

shaping a prism extender to fit within a recess of a test piece;

mounting the prism extender on a prism;

mounting the test piece adjacent to the prism with the prism extender located between a bottom surface of the recess and the prism;

directing a beam of light to the prism;

transmitting a first portion of the beam of light through the prism and prism extender toward the bottom surface of the recess;

reflecting the first portion of the beam of light from the bottom surface of the recess;

reflecting a second portion of the beam of light from a reference surface; and combining said first and second portions of the beam of light into an interference pattern indicative of differences between the bottom surface of the recess and the reference surface.

32. The method of claim 31 including the further step of transmitting the first portion of the beam from the bottom surface of the recess through both the prism extender and the prism.

33. The method of claim 32 including the further step of projecting the first and second portions of the beam toward an image-forming optic for producing an image of the interference pattern.

34. The method of claim 33 in which said step of projecting the first and second portions of the beam includes transmitting both portions through the prism.

35. The method of claim 34 in which said first and second portions of the beam emanate from the prism as planar wavefronts.

36. The method of claim 34 in which said step of projecting the first and second portions of the beam includes transmitting both portions through the prism extender.

37. The method of claim 31 in which said step of mounting the prism extender includes orienting a first surface of the prism extender adjacent to the prism and a second surface of the prism extender adjacent to the bottom surface of the recess.

38. The method of claim 37 in which said step of mounting the test piece includes locating the second surface of the prism extender at a predetermined distance from the bottom surface of the prism for refracting the first portion of the beam toward the bottom surface at grazing incidence.

39. The method of claim 38 in which said step of reflecting the second portion of the beam of light includes reflecting the second portion of the beam of light from the second surface of the prism extender.

40. The method of claim 39 in which said step of combining the first and second portions of the beam of light into the interference pattern occurs at the second surface of the prism extender.

41. The method of claim 31 in which the prism and the prism extender have adjacent surfaces, and said step of shaping the prism extender includes forming the adjacent surface of the prism extender smaller than the adjacent surface of the prism.

42. The method of claim 41 in which the prism extender includes side walls that are surrounded by side walls of the recess, and said step of shaping the prism extender includes matching the shape of the side walls of the prism extender to the shape of the surrounding side walls of the recess.

43. The method of claim 41 in which the prism extender also includes a surface adjacent to the bottom surface of the recess, and said step of shaping the prism extender includes sizing the surface of the prism extender adjacent to the bottom surface of the recess smaller than both the bottom surface of the recess and the adjacent surface of the prism.

* * * * *